United States Patent
Lichtberger

(10) Patent No.: US 9,469,482 B2
(45) Date of Patent: Oct. 18, 2016

(54) APPARATUS FOR CONVEYING MATERIAL FOR RAILWAY CONSTRUCTION

(71) Applicant: System 7—Railsupport GmbH, Vienna (AT)

(72) Inventor: Bernhard Lichtberger, Pregarten (AT)

(73) Assignee: System 7—Railsupport GmbH, Vienna (AT)

( * ) Notice: Subject to any disclaimer, the term of this patent is extended or adjusted under 35 U.S.C. 154(b) by 0 days.

(21) Appl. No.: 14/920,745

(22) Filed: Oct. 22, 2015

(65) Prior Publication Data

US 2016/0114982 A1     Apr. 28, 2016

(30) Foreign Application Priority Data

Oct. 27, 2014   (AT) .............................. A 50767/2014

(51) Int. Cl.
| | |
|---|---|
| *B65G 41/00* | (2006.01) |
| *B65G 15/24* | (2006.01) |
| *B65G 15/26* | (2006.01) |
| *E01B 27/00* | (2006.01) |
| *B65G 47/58* | (2006.01) |

(52) U.S. Cl.
CPC ............. *B65G 41/002* (2013.01); *B65G 15/24* (2013.01); *B65G 15/26* (2013.01); *B65G 41/005* (2013.01); *B65G 41/008* (2013.01); *B65G 47/58* (2013.01); *E01B 27/00* (2013.01); *E01B 2203/03* (2013.01); *E01B 2203/032* (2013.01)

(58) Field of Classification Search
CPC ...... B65G 15/24; B65G 15/26; B65G 21/12; B65G 41/002; B65G 41/005; B65G 41/008; B65G 41/18; B65G 47/18; B65G 47/58; E01B 27/00; E01B 2203/032; E01B 2203/03

USPC ......................................... 198/314, 317, 318
See application file for complete search history.

(56) References Cited

U.S. PATENT DOCUMENTS

| | | | | |
|---|---|---|---|---|
| 2,805,759 A | * | 9/1957 | Manceau ............. | A01D 51/005 198/314 |
| 3,067,858 A | * | 12/1962 | Loosli .................. | B65G 41/002 198/306 |
| 3,687,276 A | * | 8/1972 | Pelletier ................. | B65G 37/00 198/314 |
| 4,624,357 A | * | 11/1986 | Oury ....................... | E04G 21/04 198/313 |

(Continued)

FOREIGN PATENT DOCUMENTS

| | | |
|---|---|---|
| CN | 103662794 A | 3/2014 |
| DE | 202009012927 U1 | 4/2010 |

(Continued)

OTHER PUBLICATIONS

Espacenet English language Abstract for DE102009037568, dated Feb. 3, 2011.

*Primary Examiner* — Leslie A Nicholson, III
*Assistant Examiner* — Keith R Campbell
(74) *Attorney, Agent, or Firm* — Tiajoloff & Kelly LLP

(57) ABSTRACT

An apparatus for conveying material for railway construction comprises a material loading device that is movable on a chassis, in particular a crawler chassis (2) having at least one receiving conveyor belt (17) each for receiving material and having a transfer conveyer belt (9, 12) for transferring material. The transfer conveyer belt (9, 12) is rotatable about a chassis vertical axis using a rotary drive and can be adjusted in height along the chassis vertical axis by using a lifting drive (4).

19 Claims, 3 Drawing Sheets

(56) References Cited

U.S. PATENT DOCUMENTS

| | | | | |
|---|---|---|---|---|
| 6,283,269 | B1* | 9/2001 | Mayer | B65G 41/005 198/313 |
| 6,378,686 | B1* | 4/2002 | Mayer | B65G 21/14 198/311 |
| 6,386,352 | B1* | 5/2002 | Baker | B65G 41/005 198/300 |
| 6,688,450 | B2* | 2/2004 | Speers | B65G 41/005 198/303 |
| 8,506,232 | B2* | 8/2013 | Gallione | B60P 1/36 198/314 |
| 9,004,258 | B2* | 4/2015 | Wolfe | B65G 47/46 198/369.5 |
| 2013/0233682 | A1* | 9/2013 | Werlinger | B65G 21/10 198/861.2 |
| 2014/0084665 | A1 | 3/2014 | Motz et al. | |
| 2014/0202835 | A1* | 7/2014 | Watters | B02C 23/02 198/812 |

FOREIGN PATENT DOCUMENTS

| | | |
|---|---|---|
| DE | 102009037568 B3 | 2/2011 |
| DE | 102012019016 A1 | 4/2014 |

* cited by examiner

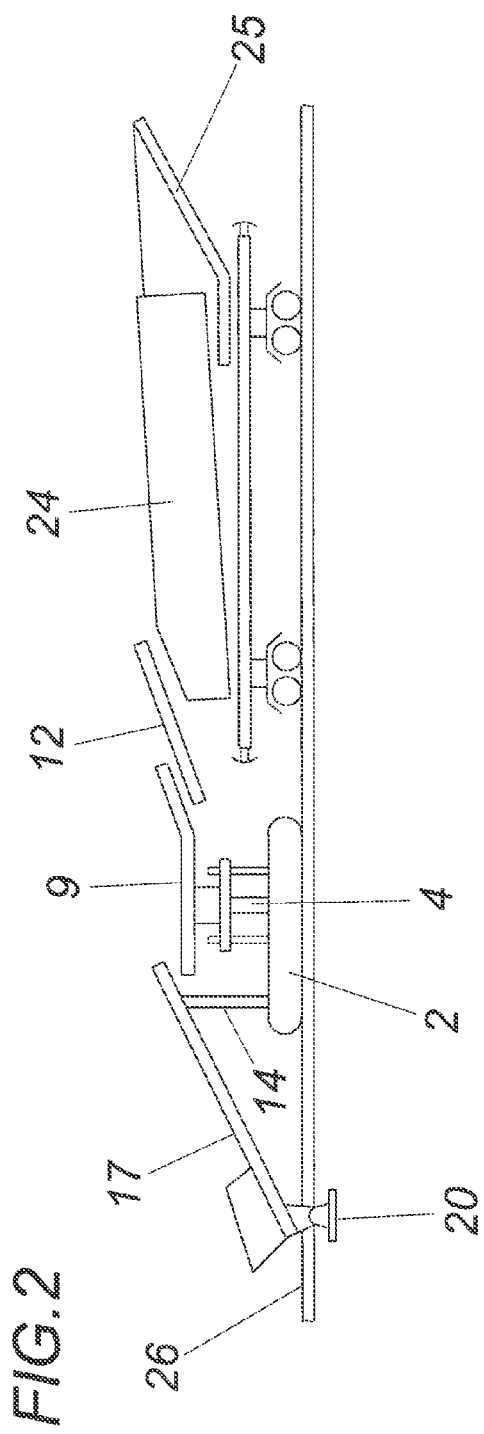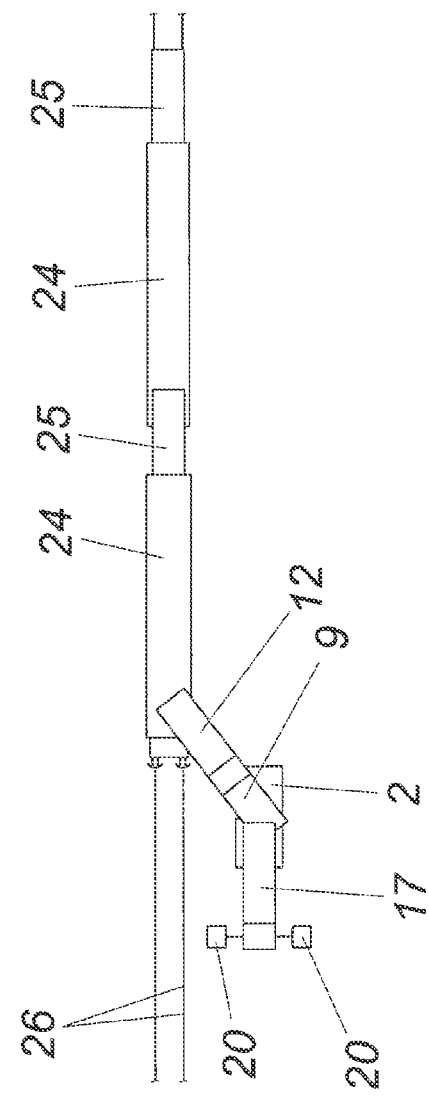

APPARATUS FOR CONVEYING MATERIAL FOR RAILWAY CONSTRUCTION

FIELD OF THE INVENTION

The invention relates to an apparatus for conveying material for railway construction, comprising a material loading device which is movable on a chassis, in particular a crawler chassis each having at least one receiving conveyor belt for receiving material and having a transfer conveyor belt for transferring material.

DESCRIPTION OF THE PRIOR ART

Such devices are used in railway construction in particular for loading and unloading material conveying silo units, for loading railway ballast wagons or can also be used universally where the apparatus can stand or be moved on the track, on a wagon or next to the track. Material conveying silo units are used for loading, delivering and conveying railway construction material such as ballast, waste or base grade protection layer material and the like in railway construction and in track maintenance. The material conveying silo units are used in construction and reconstruction measures for the tracks of the railway. They convey and store either new materials such as ballast or base grade protection layer material or used materials such as waste which accumulates during ballast cleaning work or cleaned ballast. They are also used as intermediate storage devices in ballast distributing machines or similar.

Known material conveying silo units have silo wagons which receive railway construction material between side walls spanning the silo space on a base conveyor belt for conveying the material along the base. The material silo unit comprises a plurality of wagons which are fitted with a device for transferring the material from one wagon to the next wagon in the area of their mutually facing end walls (DE 10 2009 037 568 B3). To this end, both end walls of each wagon can be pivoted downwards and one conveyor belt each for transferring the material from one wagon to the next wagon is provided on or in the two end walls. According to another embodiment, the wagon can have one lower transfer conveyor belt each in the region of the base conveyor belt at both the top ends thereof, which lower transfer conveyor belt can be controlled and actuated in such a manner that it can be pivoted or bent from a horizontal starting position upwards into a delivery position for transferring the material to the neighbouring wagons.

The material conveying silo units are loaded either in ballast works or with the aid of loading devices into which the material is introduced by means of bulldozers, diggers or similar. Such a known loading station is fitted with a chassis which can run on rails. The framework of this loading station with the conveyor belts is designed so that it can be lowered downwards on one side so that the loading hopper comes to lie lower. The height for loading a material conveying silo unit is achieved by means of two conveyor belts.

Another known loading station is fitted with a crawler chassis with which it can be moved on terrain. It consists of a conveyor belt with loading hopper and two conveyor belts. This loading station must be positioned at a 90° angle to the track whereby material conveying silo units located along the track can then be loaded. In order that the loading station stands straight, unevenness as well as the height to the railway embankment must be evened out by means of a backfilling with gravel or sand.

Another loading station which can be moved on rails comprises a rotatable conveyor belt with which ballast can be received from a material conveying silo unit and then unloaded at the side. In this case, the pivoting conveyor belt is designed to be sufficiently high and suitable in range that railway construction material can also be loaded onto ballast wagons located on the neighbouring track. The pivotable unloading conveyor belts of conventional material conveying silo units are so short that their range does not allow any unloading into material transporting wagons in the case of larger track spacings.

SUMMARY OF THE INVENTION

It is therefore the object of the invention to provide an apparatus of the type described initially which integrates the various possibilities described of the known loading stations described into a material loading machine which can thus be used more universally.

The invention solves the formulated object whereby the transfer conveyor belt is rotatable about a chassis vertical axis by means of a rotary drive and can be adjusted in height along the chassis vertical axis by means of a lifting drive.

For this purpose, a height-adjustable platform is provided on a chassis, for example, a crawler chassis on which a rotating assembly is located by which means the transfer conveyor belt can be rotated about a chassis vertical axis. The transfer conveyor belt is additionally height-adjustable with the height-adjustable platform along the chassis vertical axis by means of a lifting drive. The height position of the transfer conveyor belt can be adjusted by means of the lifting drive and its pivot position by means of the rotary drive.

It is advantageous if the transfer conveyor belt is composed of a rear transfer conveyor belt and at least one front transfer conveyor belt, where the rear transfer conveyor belt is designed to be bent upwards in the conveying direction, i.e. has at least two sections with different slopes and where the front transfer conveyor belt is set at the gradient angle of the second section in the conveying direction. The first section receives the material from the receiving conveyor belt and the second section conveys the material onto the front transfer conveyor belt, which then brings the material to the required height position and delivers it.

In order to be able to vary the height position in a simple manner, it is proposed to configure the front transfer conveyor belt to be movable, i.e. displaceably by means of an adjusting device parallel to the second section. Optionally the transfer conveyor belt can be configured to be telescopic. The front one of the two conveyor belts is therefore, expressed simply, extendable or retractable.

In addition, for the purpose of adjustment of the gradient angle of the transfer conveyor belt, the transfer conveyor belt can be adjustable in inclination about a chassis horizontal axis of a bearing by means of an inclination drive.

For the orderly transfer of material to the height-adjustable transfer conveyor belt, it is advantageous if the receiving conveyor belt located in front of the transfer conveyor belt in the conveying direction, optionally fitted with a loading hopper, is height-adjustable along a chassis vertical axis by means of a lifting drive.

Both conveyor belts together can be transversely inclined. A receiving conveyor belt with loading hopper is fitted with telescopic support devices. The receiving conveyor belt is designed to be height-adjustable and variable in its angle of attack.

The device can be used particularly universally if the receiving conveyor belt located in front of the transfer conveyor belt in the conveying direction, optionally fitted with a loading hopper, is adjustable in inclination by means of an actuator for the purpose of adjusting the angle of inclination of the receiving conveyor belt. In addition, the lifting drive can comprise two hydraulic cylinders by means of which the transfer conveyor belt can be tilted about its conveyor longitudinal axis with the result that the device can also be used correctly, for example, on slopes.

Two conveyor belts are mounted on the rotating assembly by means of a rotating device such as, for example, a pivot bearing. The conveyor belts can be inclined laterally with the aid of at least one hydraulic cylinder. The front conveyor belt in this case can be extended and retracted. For loading and transport purposes, the front conveyor belt can be completely retracted. A drive diesel motor, a power generator, a control unit and a hydraulic supply unit are located on the crawler chassis. Also located on the crawler chassis is a receiving conveyor belt with loading hopper. This receiving conveyor belt is designed with a height adjusting device, e.g. one or two hydraulic cylinders. In addition, it can be varied in its angle of attack using another hydraulic cylinder and brought into a loading and transport position. The receiving conveyor belt is supported at the rear lower end. The support brackets can be extended in a telescopic manner, e.g. by means of hydraulic cylinders or manually. The support width can thus be varied and the stability against tilting can be increased for which the receiving conveyor belt can be assigned supports which are adjustable with regard to their mutual spacing with respect to one another, which can be deployed transversely to the conveying direction of the conveyor belt beyond the width of the conveyor belt by means of an actuator.

BRIEF DESCRIPTION OF THE DRAWING

The inventive subject matter is shown schematically for an exemplary embodiment in the drawing. In the figures FIG. 2 shows a ballast load on a material conveying silo unit where the material loading machine is standing on the track and is supported laterally on the sleepers or the track bed in side view, FIG. 3 shows a device according to the invention standing at the side of the track when loading a material conveying silo unit in plan view.

DESCRIPTION OF THE PREFERRED EMBODIMENT

Figure 1:
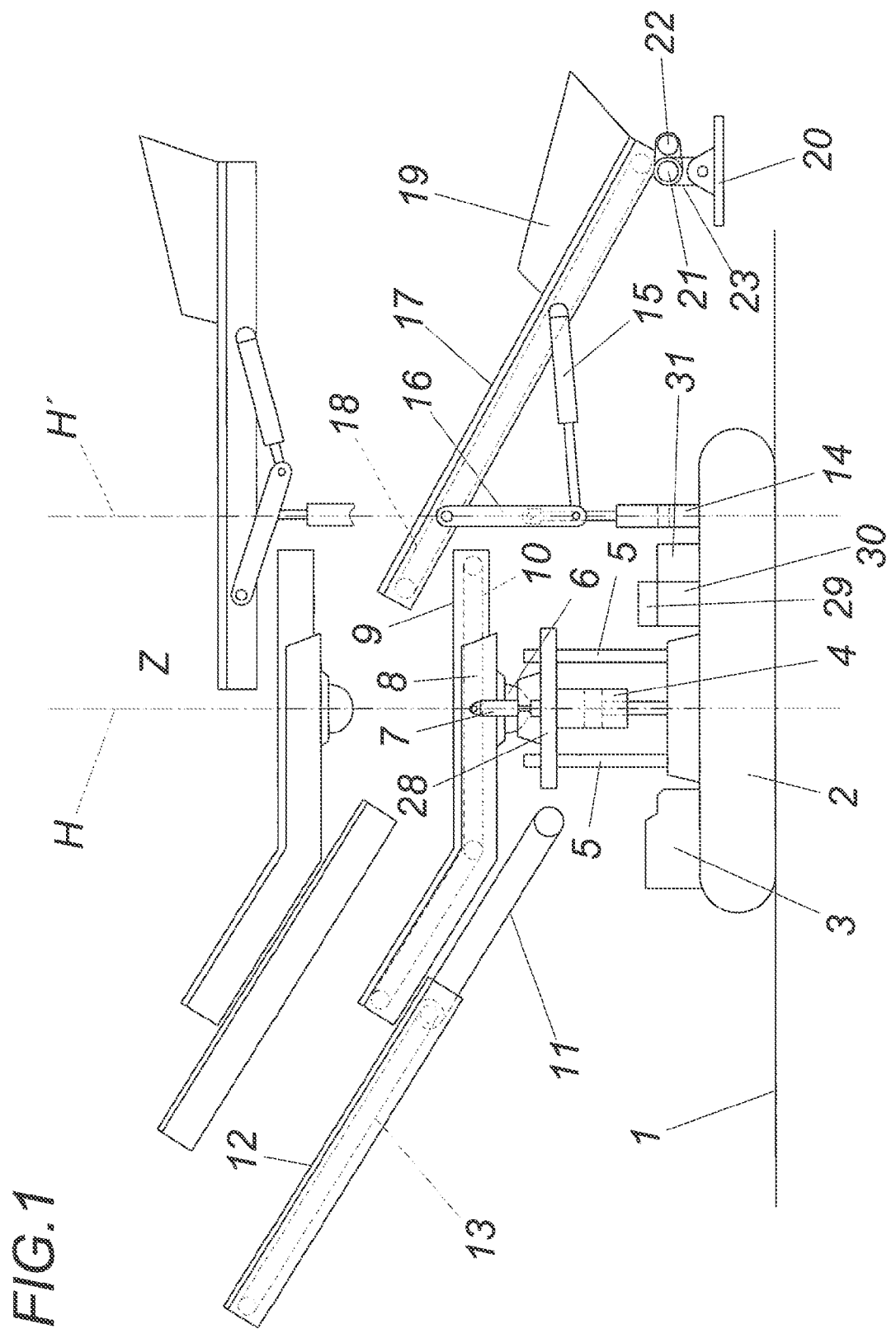
FIG. 1 shows a material loading machine according to the invention in side view, the view Z shows the conveyor belts in a possible loading position.

A device according to the invention, a material loading machine (FIG. 1) for the universal loading and unloading of material in railway construction consists of a chassis 2 with diesel drive motor 3, electric power supply unit 30, hydraulic supply 31 and electric/electronic control unit 29. A rotating assembly 28 can be adjusted in height by means of a hydraulic cylinder 4. The rotating assembly 28 is guided by means of guide pillars 5. Located on the rotating assembly 28 is a chain conveyor belt 9 which is mounted on the rotating assembly 28 by means of a pivot bearing 6. The conveyor belt 9 can be inclined laterally relative to the vertical by means of at least one hydraulic cylinder 7. Connected to this conveyor belt 9 is another conveyor belt 12 which can be extended and retracted by means of a chain drive 11 or similar drive. Conveyor belt 9 and conveyor belt 12 together form the transfer conveyor belt (9, 12). The conveyor belts 12 and 17 can be designed as belt straps 13, 18 or also as chain belts.

For the loading of ballast, for example, by means of a digger, a receiving conveyor belt 17 is provided with loading hoppers 19. This receiving conveyor belt can be adjusted in height by means of two hydraulic cylinders 14 and the receiving conveyor belt 17 can be varied in its angle of attack by means of a pivot arm 16 and a pivoting cylinder 15 and can be brought from its loading position into its transport position.

Figure 5:
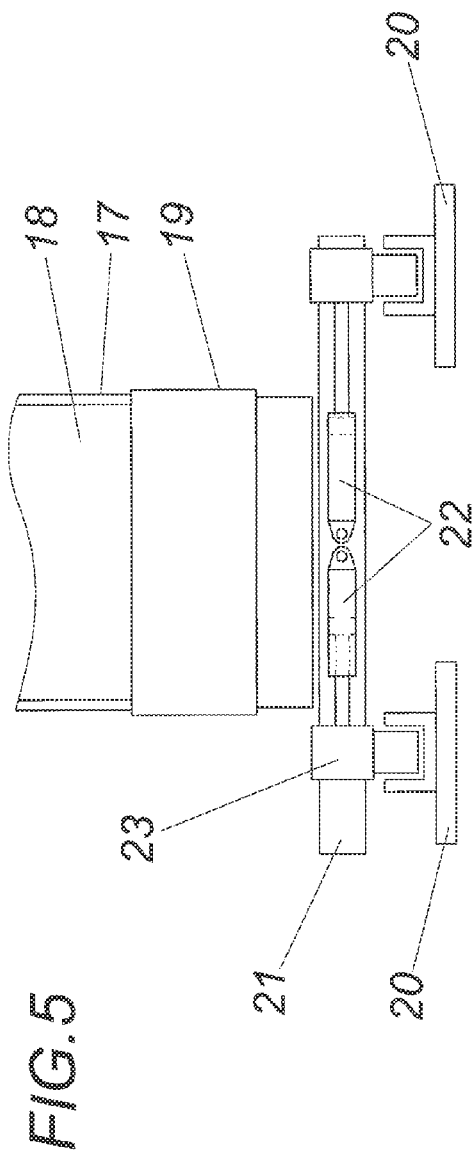

The receiving conveyor belt 17 has supporting devices (FIG. 5). These consist of support plates 20 mounted in an articulated manner. Via a guide rod 21, the support width can be adjusted continuously by means of bushings 23 on which the support plates 20 are fastened and by means of hydraulic cylinders 22. The material loading machine here has a length of around 15-20 m, a width of 2.5-3.5 m and a loading height above the point of contact of the chassis of 5.5-6.5 m. The width of the conveyor belts provided is about 2 m and the belt speeds v provided are around 0.8-1.2 m/s for conveyed quantities of 500-800 m$^3$/h.

When loading material conveying silo units located on the track (FIG. 2), the material loading machine is positioned with the crawlers 2 on the rails 26. The rear transfer conveyor belt 9 is adjusted by means of the height adjustment 4 and the front transfer conveyor belt 12 is adjusted by means of the extension adjustment 11 so that the material conveying silo unit 24 can be loaded. The material loading machine is supported laterally on the sleepers or on the ballast bed by means of supporting devices 20.

FIG. 3 shows the device standing laterally beside a track during loading of a material conveying silo unit in plan view, where the end of the transfer conveyor belt is rotated with the rotating assembly so far towards the track that the material conveying silo unit can be loaded, for which purpose the height of the transfer conveyor belt and the receiving conveyor belt are adjusted accordingly and when the loading machine is inclined, the upper transfer conveyor belts are accordingly inclined in the opposite direction.

When loading material conveying silo units 24 or conventional ballast wagons 27 which are located on the track 26 or when loading should take place from the side, the material loading machine stands next to the track. On account of the rotating device 28, the device can stand at any angle (0-180°) to the track and carry out loading. The ballast is usually supplied by lorry or diggers. As shown as an example in FIG. 3, the transfer conveyor belts 9, 12 are pivoted laterally so that they enter into the material conveying silo unit 24. The height of the belt as well as the distance can be adapted accordingly by means of the lifting device 4 and the extension device 11. Sloping positions can be compensated by means of the inclination adjustment 7 or specifically set.

Figure 4:
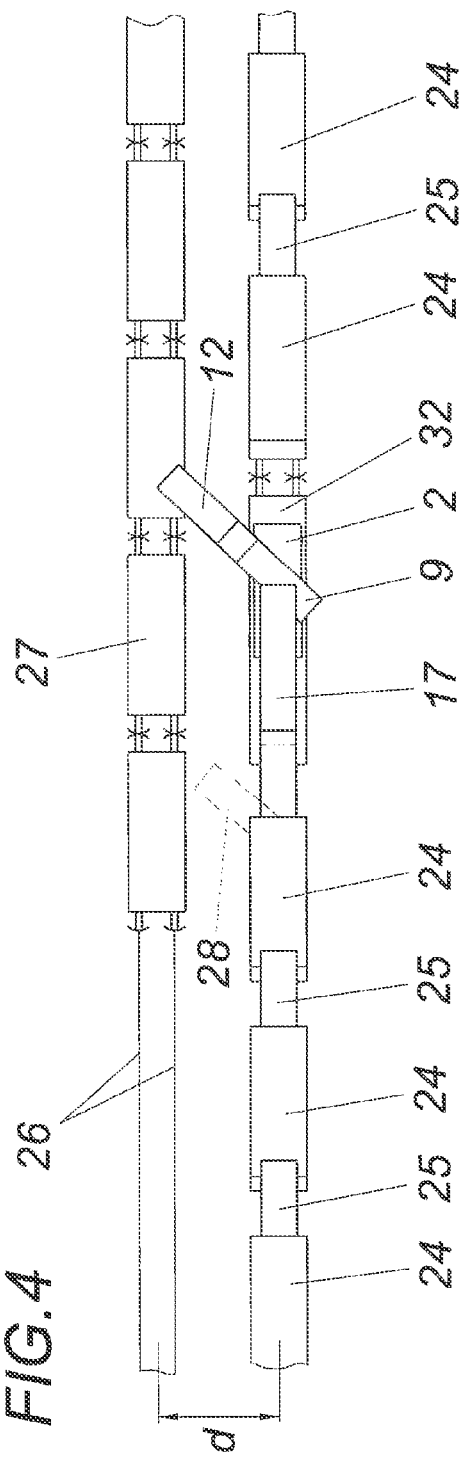
FIG. 4 shows the device according to the invention standing on a low loader wagon in plan view and FIG. 5 shows a front view of the receiving conveyor belt with laterally adjustable support devices.

When transferring the material from material conveying silo units 24 onto conventional ballast wagons 27 on the neighbouring track 26, the material loading machine is placed on a low loader wagon 32. As shown as an example in FIG. 4, the transfer conveyor belts 9, 12 are pivoted laterally so that they enter into the ballast wagons 27. The height is adapted here by means of the height adjustment 4. The length of the transfer conveyor belt is such that track spacings d greater than 4 m can be accommodated. As depicted in FIG. 4, the transfer conveyor belts 28 of the material conveying silo units 24 are too short to enter into the ballast wagons 27 when the track spacings are greater than 4 m. Since in addition the height of the transfer conveyor belts 25 of the material conveying silo units 24 cannot be adjusted, their possible applications are dependent on and limited by the type of ballast wagon 27 (wall heights, widths) and the actual superelevation of their own and the neighbouring track. These restrictions are dispensed with in the material loading machine according to the invention. In the image shown the material conveying silo units located behind the material loading machine are unloaded.

If the transfer conveyor belts 9, 12 are not pivoted, the material loading machine on the low loader wagons 32 can also be used as a through-conveying system between the rear and the front material conveying silo units 24.

What is claimed is:

1. Apparatus for conveying material for railway construction, said apparatus comprising: a material loading device which is movable on a chassis, said chassis being a crawler chassis having at least one receiving conveyor belt receiving material and having a transfer conveyor belt transferring material, wherein the transfer conveyor belt is rotatable about a chassis vertical axis using a rotary drive and can be adjusted in height along the chassis vertical axis using a lifting drive; and
   wherein the transfer conveyor belt is composed of a rear transfer conveyor belt and at least one front transfer conveyor belt, wherein the rear transfer conveyor belt is designed to be bent upwards in the conveying direction and has at least two sections with different slopes and wherein the front conveyor belt is set at the gradient angle of the second section in the conveying direction.

2. The apparatus according to claim 1, wherein the front transfer conveyor belt is displaceable using an adjusting device parallel to the second section.

3. The apparatus according to claim 1, wherein the transfer conveyor belt is adjustable in inclination about a chassis horizontal axis of a bearing using an inclination drive so as to provide for adjustment of the gradient angle of the transfer conveyer belt.

4. The apparatus according to claim 1, wherein the receiving conveyor belt located in front of the transfer conveying belt in the conveying direction is height-adjustable along a chassis vertical axis using a lifting drive.

5. The apparatus according to claim 1 wherein the receiving conveyor belt located in front of the transfer conveying belt in the conveying direction, is adjustable in inclination using an actuator providing adjusting of the gradient angle of the receiving conveyor belt.

6. The apparatus according to claim 1 wherein the receiving conveyor belt is assigned supports that are adjustable with respect to one another with regard to mutual spacing thereof, and that can be deployed transversely to the conveying direction of the conveyor belt beyond the width of the conveyor belt using an actuator.

7. The apparatus according to claim 4 wherein the lifting drive comprises two hydraulic cylinders by which the transfer conveyor belt can be tilted about a conveying longitudinal axis thereof.

8. An apparatus for conveying material for railway construction, said apparatus comprising:
   a chassis capable of movement on terrain supporting the apparatus so that the apparatus can be moved;
   a receiving conveyor belt supported on the chassis and configured to receive material thereto and
   a transfer conveyor belt supported on the chassis and configured to transfer material therefrom,
   a rotary drive selectively rotating the transfer conveyor belt about a chassis vertical axis, and
   a lifting drive adjusting a height of the transfer conveyor belt along the chassis vertical axis; and
   the transfer conveyor belt comprising a rear transfer conveyor belt and a front transfer conveyor belt;
   the rear transfer conveyor belt having at least two sections with different respective slopes such that the rear transfer conveyor belt is bent upwards in a conveying direction in which material thereon is conveyed; and
   the front transfer conveyor belt being supported at a gradient angle that is substantially aligns to a gradient angle of the slope of the second section in the conveying direction.

9. The apparatus according to claim 8, wherein an adjusting device provides for adjusting displacement of the front transfer conveyor belt in a direction parallel to the second section.

10. The apparatus according to claim 8, wherein the adjusting device extends and contracts in a telescopic manner.

11. The apparatus according to claim 8, wherein the apparatus further comprises:
    a bearing having a chassis horizontal axis and being operatively associated with the transfer conveyor belt; and
    an inclination drive adjusting inclination of the transfer conveyor belt about said chassis horizontal axis so as to provide adjustment of a gradient angle of the transfer conveyor belt.

12. The apparatus according to claim 8, wherein a lifting drive adjusts a height of the receiving conveyor belt in a second chassis vertical axis.

13. The apparatus according to claim 8, wherein the receiving conveyor belt has a loading hopper connected therewith.

14. The apparatus according to claim 8, wherein an actuator adjusts inclination of the receiving conveyor belt so as to adjust a gradient angle thereof.

15. The apparatus according to claim 8, wherein the receiving conveyor belt has supports associated therewith and an actuator that adjusts respective positions thereof, said positions being displaced transversely to the conveying direction of the receiving conveyor belt beyond a width thereof.

16. The apparatus according to claim 12, wherein the lifting drive comprises two hydraulic cylinders by which the transfer conveyor belt can be tilted about an axis parallel to the conveying direction.

17. The apparatus according to claim 2, wherein the front transfer conveyer belt is configured to be telescopic.

18. The apparatus according to claim 4, wherein the receiving conveyer belt is fitted with a loading hopper.

19. The apparatus according to claim 5, wherein the conveyer belt is filled with a loading hopper.

* * * * *